US012400575B2

(12) United States Patent
Kyles et al.

(10) Patent No.: US 12,400,575 B2
(45) Date of Patent: Aug. 26, 2025

(54) SYSTEM AND METHOD FOR DRIVING A PIXEL WITH OPTIMIZED POWER AND AREA

(71) Applicant: Snap Inc., Santa Monica, CA (US)

(72) Inventors: Ian Kyles, West Linn, OR (US); Trent D. Whitten, Portland, OR (US); Jamie J. LeVasseur, Vancouver, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/040,410

(22) PCT Filed: Nov. 23, 2021

(86) PCT No.: PCT/US2021/060477
§ 371 (c)(1),
(2) Date: Feb. 2, 2023

(87) PCT Pub. No.: WO2022/109447
PCT Pub. Date: May 27, 2022

(65) Prior Publication Data
US 2023/0282150 A1 Sep. 7, 2023

Related U.S. Application Data

(60) Provisional application No. 63/117,240, filed on Nov. 23, 2020.

(51) Int. Cl.
*G09G 3/20* (2006.01)
*G09G 3/14* (2006.01)
*G09G 3/18* (2006.01)

(52) U.S. Cl.
CPC ............. *G09G 3/2085* (2013.01); *G09G 3/14* (2013.01); *G09G 3/18* (2013.01); *G09G 3/2018* (2013.01);
(Continued)

(58) Field of Classification Search
CPC ......... G09G 2310/0235; G09G 3/3688; G09G 3/3629; G09G 2300/0408; G02F 1/133622
See application file for complete search history.

(56) References Cited

U.S. PATENT DOCUMENTS 6,078,303 A * 6/2000 McKnight ............ G09G 3/2011 345/94
2004/0189561 A1 9/2004 Willis
(Continued)

FOREIGN PATENT DOCUMENTS

CN 116472574 A 7/2023
TW 367482 B 8/1999
(Continued)

OTHER PUBLICATIONS

"International Application Serial No. PCT/US2021/060477, International Search Report mailed Apr. 20,2022", 3 pgs.
(Continued)

*Primary Examiner* — Yuzhen Shen
(74) *Attorney, Agent, or Firm* — Schwegman Lundberg & Woessner, P.A.

(57) ABSTRACT

A system of the present invention reduces the size and/or increases the efficiency of a display system or device that integrates or includes a display, for example, an LED display such as a microLED display and OLED display or an LCoS display into such system or device. Embodiments of the present disclosure include, but are not limited to, a display wherein the at least two pixels are four pixels comprising two green pixels, one blue pixel, and one red pixel, and wherein a pixel logic circuit maintains the red pixel in an on state while driving the two green pixels and the blue pixel in accordance with a field sequential color (FSC) pixel drive process or method.

20 Claims, 12 Drawing Sheets

(52) U.S. Cl.
CPC ... *G09G 3/2074* (2013.01); *G09G 2300/0452* (2013.01); *G09G 2300/0456* (2013.01); *G09G 2310/0264* (2013.01)

(56) References Cited

U.S. PATENT DOCUMENTS

| | | | | |
|---|---|---|---|---|
| 2007/0222743 | A1* | 9/2007 | Hirakata | G09G 3/3651 345/102 |
| 2009/0059581 | A1* | 3/2009 | Hayashi | G09G 3/3607 362/234 |
| 2009/0135129 | A1* | 5/2009 | Roth | G09G 3/3413 345/102 |
| 2010/0045690 | A1* | 2/2010 | Handschy | G09G 3/3629 345/545 |
| 2017/0061842 | A1* | 3/2017 | Cok | G09G 3/2003 |
| 2017/0330509 | A1* | 11/2017 | Cok | G09G 3/2014 |
| 2018/0151637 | A1* | 5/2018 | Kajiyama | H10K 59/353 |
| 2019/0347990 | A1* | 11/2019 | Knez | G09G 3/2022 |
| 2020/0020676 | A1* | 1/2020 | Cok | H10H 29/142 |
| 2021/0249394 | A1* | 8/2021 | Ikeda | G09F 9/302 |
| 2022/0375906 | A1* | 11/2022 | Kim | G09G 3/32 |

FOREIGN PATENT DOCUMENTS

| | | | |
|---|---|---|---|
| TW | 202030717 | A | 8/2020 |
| WO | WO-2008086222 | A2 | 7/2008 |
| WO | WO-2022109447 | A1 | 5/2022 |

OTHER PUBLICATIONS

"International Application Serial No. PCT/US2021/060477, Written Opinion mailed Apr. 20, 2022", 5 pgs.

"International Application Serial No. PCT/US2021/060477, International Preliminary Report on Patentability mailed Jun. 1, 2023", 7 pgs.

"Korean Application Serial No. 10-2023-7020795, Notice of Preliminary Rejection mailed Sep. 10, 2024", w/ English translation, 17 pgs.

"Korean Application Serial No. 10-2023-7020795, Response filed Nov. 7, 2024 to Office Action mailed Sep. 10, 24", w/ English claims, 28 pgs.

"Taiwanese Application Serial No. 110143464, Office Action mailed Jan. 24, 2025", w/ English machine translation, 35 pgs.

"Korean Application Serial No. 10-2023-7020795, Final Office Action mailed Mar. 26, 2025", w/ English translation, 7 pgs.

* cited by examiner

SYSTEM AND METHOD FOR DRIVING A PIXEL WITH OPTIMIZED POWER AND AREA

CROSS-REFERENCE TO RELATED APPLICATION

This application is a U.S. National Stage Filing under 35 U.S.C. 371 from International Application No. PCT/US2021/060477, filed on Nov. 23, 2021, and published as WO 2022/109447 on May 27, 2022, which application claims priority to U.S. Provisional Patent Application No. 63/117,240, filed Nov. 23, 2020, and entitled "SYSTEM AND METHOD FOR DRIVING A PIXEL WITH OPTIMIZED POWER AND AREA", the entire contect of which is incorporated herein by reference.

FIELD OF THE INVENTION

This disclosure relates to displays, for example, liquid crystal-on-silicon (LCoS) displays, light-emitting diode (LED) displays, including microLED displays and OLED displays, and microdisplays (e.g., LCoS or LED displays). More particularly, the present invention is directed to displays that operate in accordance with field sequential drive techniques.

BACKGROUND

Typical Augmented Reality (AR) headsets include devices that fit on the face or around the head. In order to generate an AR image, the headsets have to accommodate many components, such as two displays, optical components (e.g., an optical engine), and power supplies. Consequently, AR headsets may be bulky and large in size. In mobile systems, such as AR and Head-Mounted systems, LCoS or microLED type displays are commonly utilized. The volume, weight, and battery life of the displays utilized in such systems are of importance in making such systems, so that the systems can be worn as comfortably as possible, for long periods, before the systems or devices needed to be recharged.

LED displays, often driven by TFT arrays, may be utilized in AR systems, for example, Head-Mounted systems, and are relatively inexpensive. However, TFTs have high resistance and thus consume a significant amount of power. As such, it may also be challenging to use such TFTs to drive large currents. Also, it is challenging to shrink TFTs to an optimal size for a microdisplay as they use larger geometries than transistors fabricated on a silicon wafer. While LCoS microdisplays made with silicon backplanes can position logic and memory under pixels, such devices operate in a color sequential manner that involves reusing the same pixel and mirror for red, green and blue color fields in succession. When driving LEDs, either multiple panels (one for each color) may be required, thereby tripling the size of the subsystem, or a spatial color arrangement, involving multiple LEDs of varying colors on one panel, may be used. However, these options generally result in a display or display system size that is not optimal, for example, for an AR system or device. Displays, in accordance with the present invention, for example, liquid crystal-on-silicon (LCoS) displays, light-emitting diode (LED) displays, including microLED displays and OLED displays, and microdisplays (e.g., LCoS or LED displays) may be utilized in applications including, but not limited to, projectors, head-up displays, and augmented reality (AR), mixed reality (MR), and virtual reality (VR) systems or devices, such as headsets or other near-eye devices or systems.

An aspect of the present invention may involve, for example, driving a master pixel, by driving the sub-pixels in a field-sequential manner and/or a hybrid mode, such that a single pixel drive circuit, including pixel logic circuitry (e.g., pixel control logic circuitry), is used to drive at least two subpixels or LEDs/LED pixels (e.g., microLEDs). As such, a drive circuit or separate drive circuitry is not needed for each of the subpixels or LEDs/LED pixels (e.g., microLEDs). In an exemplary aspect of the present invention, one or more of the pixels of a master pixel may be on all of the time during a frame or color subframe, while one or more of other pixels (e.g., subpixels, LEDs, or microLEDs) are driven in accordance with a field-sequential operation. In an exemplary aspect of the present invention, the display is a multi-color display, for example, a multi-color microLED display that includes master pixels having multiple, color LEDs as subpixels (where the color of an LED may differ from the color of another one of the LEDs). In an exemplary aspect of the present invention, a display is an LCoS display driven in field-sequential color operation.

Comparative examples of displays may require a separate set of drive circuitry for each sub-pixel within a master pixel (e.g., for each in the collection of red, green, and blue sub-pixel LEDs). Exemplary aspects of the present invention re-use drive circuitry (e.g., pixel circuitry, pixel control circuitry, pixel logic circuitry, or pixel control logic circuitry) over time, and reduce the number of copies of such circuitry needed for driving displays in accordance with the present invention. Consequently, displays in accordance with the present invention have reduced master pixel size, and thus are a reduced in overall size. MicroLED displays, in accordance with the present invention, are an alternative to other types of displays, and offer a compact form-factor and high optical engine efficiency, as an external illumination source is not needed. In an example of a microLED display, in accordance with the present invention, active pixels only are illuminated, in contrast to, for example, LCoS displays, where the entire display is illuminated regardless of whether the contents of an image require it.

Exemplary aspects of the present invention reduce the size and/or increase the efficiency of a display system or device that integrates or includes a display, for example, an LED display, such as a microLED display and OLED display, in accordance with the present invention, into such system or device. Examples of circuitry, in accordance with the present invention, allow for a display small of small size, while delivering adequate resolution and brightness to pixels of the display, utilizing a reasonable amount of power. Displays including circuitry, in accordance with the present invention, have a battery volume that powers a display and its related circuitry low. Displays including circuitry, in accordance with the present invention, also, allow for the weight of a display and its related circuitry to be low. Displays, in accordance with the present invention, provide advantages when utilized in applications including, but not limited to, projectors, head-up displays, and augmented reality (AR), mixed reality (MR), and virtual reality (VR) systems or devices, such as headsets or other near-eye devices or systems.

BRIEF DESCRIPTION OF THE DRAWINGS

The present disclosure is illustrated and described herein with reference to the various drawings, in which like reference numbers are used to denote like system components, as appropriate, and in which.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
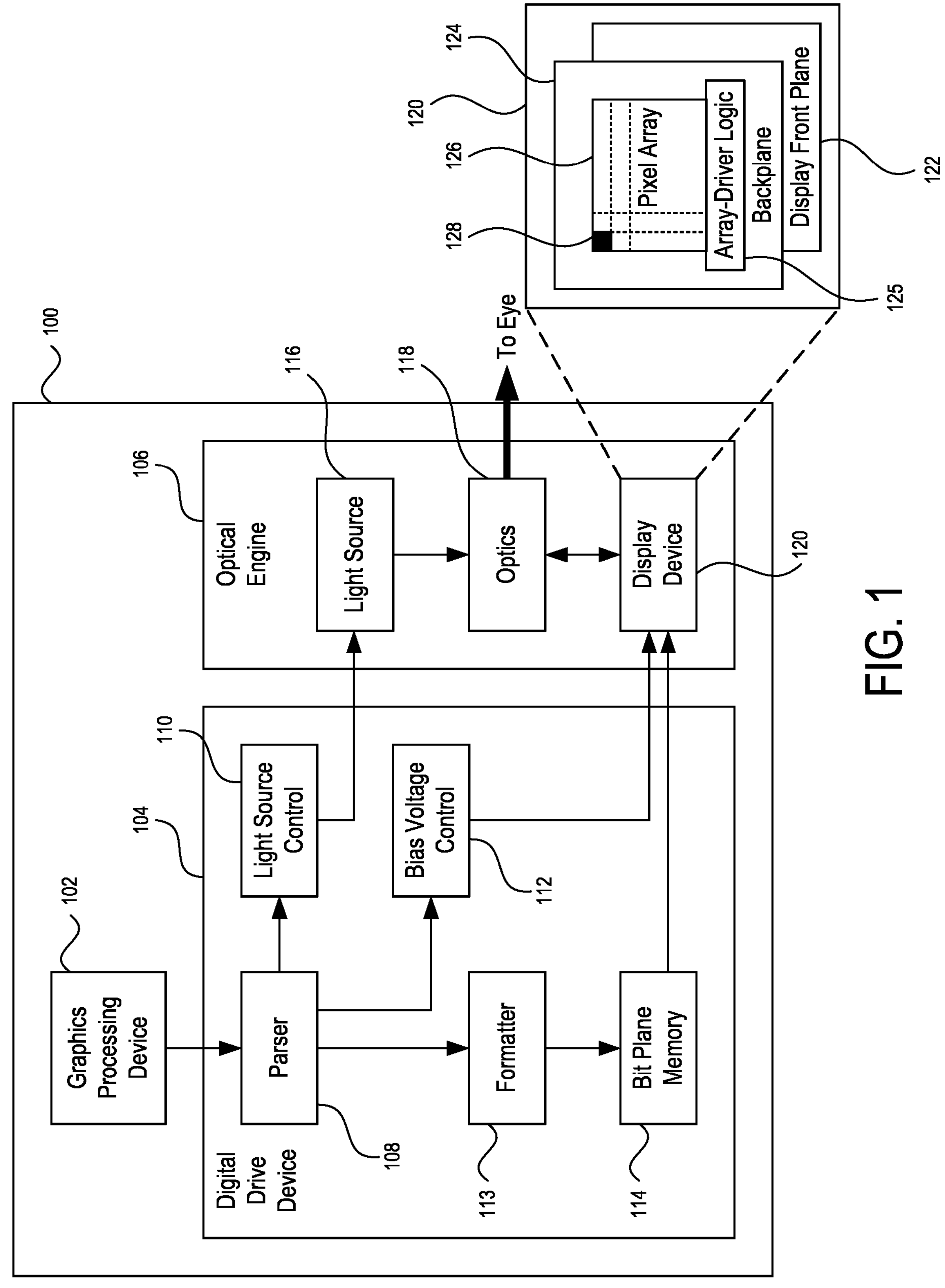
FIG. 1 illustrates an exemplary display system in accordance with various aspects of the present disclosure.

Referring to FIG. 1, a block diagram of an exemplary aspect of a display system 100, according to the present disclosure, is provided by way of environmental context. As illustrated, the display system 100 may include a graphics processing device 102 electrically coupled to a digital drive device 104, and an optical engine 106 electrically and/or optically coupled to the digital drive device 104.

The graphics processing device 102 delivers image data and/or control data to the digital drive device 104. The graphics processing device 102 generally includes a processor, or is associated with a processor, as well as other components known to those of ordinary skill in the art. The processor may be internal or external to the graphics processing device 102. In an exemplary aspect of the present disclosure, the processor may execute software modules, programs, or instructions of the graphics processing device 102. A storage device (e.g., a memory device or memory block) may also be internal or external to the graphics processing device 102.

The digital drive device 104 receives data from the graphics processing device 102, parses that data in Parser 108, and arranges the received data prior to communicating data, for example, image data, to the optical engine 106. The Parser 108 separates and/or identifies image and command data, and routes information (e.g., based on the received data) to Light Source Control 110, Formatter 113, and Voltage Bias Control 112 modules. The Light Source Control 110 is only used if the display is an LCoS display.

The Light Source Control 110 converts received commands into timed control inputs. The Bias Voltage Control 112 converts received commands into voltages and the formatter 113 converts image data into a binary formatted data (for instance "Bit Planes") which are used to drive the state of the pixels in the display 120 after the Bit Planes have been stored in the Memory 114 (which is used as a staging area and may additionally store control data). The digital drive device 104 may be, for example, a component of a computing system, head mounted device, and/or other device utilizing an LCoS or microLED (uLED) display.

In an exemplary aspect of the present disclosure, the optical engine 106 contains the Spatial Light Modulator or display 120 components and all other devices that may be required to complete the display system 100, as is well known to those of ordinary skill in the art. In other exemplary aspects of the present disclosure, the display 120 may itself be located external to the optical engine 106. If using an LCoS display, an Optical Engine 106 may be utilized to contain Light Source 116 which is controlled such that it illuminates Spatial Light Modulator 120 with electromagnetic radiation (e.g., light) intensity and on/off timing provided by Light Source Control 110. The display 120 includes a pixel array 126, which includes a two-dimensional array of master pixels 128 arranged in a series of rows and column indicated by dashed lines. In FIG. 1, only one master pixel 128 is highlighted, and only two rows and two columns are shown. However, in practical implementations up to a thousand or more rows and columns may be present in the pixel array 126, such that up to a million or more master pixels 128 may be present in the display 120.

In an LCoS display the Spatial Light Modulator 120 contains the display Front Plane 122, for example, a liquid crystal (LC) cell, which modulates reflected or transmitted light under the influence of or in accordance with an electrical input from pixel circuitry underlying the pixel elements (e.g., pixel electrodes or conductive metallic elements, such as reflective metallic mirrors) of a pixel 128 of the two-dimensional Pixel Array 126 which resides in, is coupled to, and/or integrated with the Backplane integrated circuit 124 which also contains pixel circuitry, for example, Pixel Array Drive logic 125 which provides image data and/or control data connecting to the Pixel Array which are distributed to rows or columns of pixels, depending on the function of the data. In an LED display (e.g., a microLED display) the Spatial Light Modulator 120 contains the display Front Plane 122, for example, an array of LEDs (for example, microLEDS), which output light under the influence of or in accordance with an electrical input from the pixel circuitry underlying the pixel elements (e.g., LEDs and microLEDs; see FIG. 2A-2B) of a pixel 128 of the two-dimensional Pixel Array 126 which resides in, is coupled to, and/or integrated with the Backplane integrated circuit 124. Pixels 128 in the backplane are coupled or electrically connected to the front plane and modulate the reflected light in accordance with the binary patterns provided from Memory 114. In an exemplary aspect of the present invention, a pixel 128 may include pixel elements (e.g., pixel electrodes or conductive and reflective metallic elements, such as reflective metallic mirrors, or light-emitting structures such as LEDs, and microLEDs) pixel circuitry (for example, pixel control or drive circuitry, and a driver device (e.g., a current or voltage driver device or system). In an exemplary aspect of the present invention, the pixel control or drive circuitry includes pixel logic or logic function(s). In a microLED display the LED array is emissive, and the backplane modulates the drive current to the LEDs of each pixel to illuminate them or not, in accordance with the binary patterns provided from Memory 114.

As described in subsequent figures, the pixel or pixel unit 128 includes or is integrated with or electrically coupled to memory elements in FIGS. 2-6 (e.g., static random-access memory (SRAM) elements) and pixel circuitry/pixel driver circuitry (e.g., circuitry of FIGS. 2-6) in accordance with the present invention. The memory elements of the pixel are loaded repeatedly from the binary patterns provided from the Memory 114 creating a time-dependent pixel state resulting in a gray-scale value (degree of illumination) at each pixel. In the case of an LCoS display, the pixel circuitry/pixel driver circuitry serves to translate lower-voltage outputs from the memory elements to the higher voltages required to perform electro-optic modulation in the Front plane 122. In the case of a microLED display a Pixel Driver (that is included in the pixel circuitry/pixel driver circuitry) is a current source which converts a binary output into a controlled current that is on or off, varying with time.

The Optics 118 within the Optical Engine 106 may contain beam splitters, polarizers (or polarizing beam splitters), lenses and waveguides and serves to route the light from the light source 116 to the spatial light modulator 120 and then pass the resulting modulated image to the user's eye.

Figure 2A:
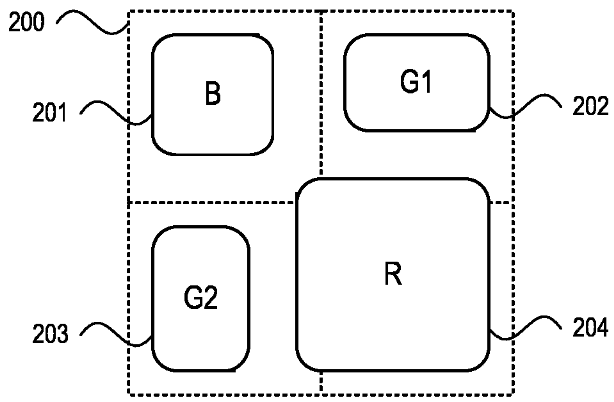
FIGS. 2A-3B respectively illustrate exemplary multi-color sub-pixels in a master pixel system in accordance with various aspects of the present disclosure.
Figure 2B:
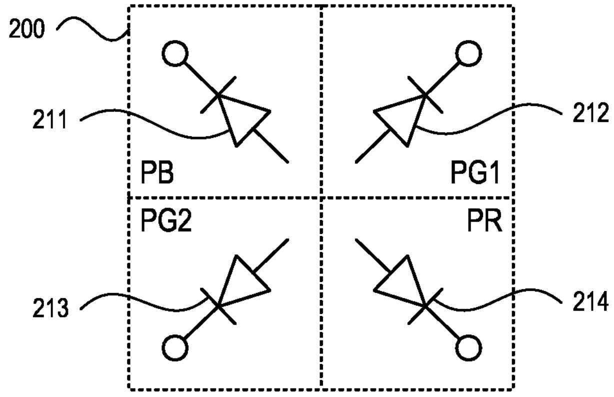

FIGS. 2A and 2B illustrate an example layout of a master pixel 200, in accordance with the present invention, and a schematic rendition of the same. The master pixel 200 may be the same as the pixel 128 illustrated in FIG. 1. As shown in FIG. 2A, the master pixel 200 includes four sub pixels 201-204. In the example shown in FIG. 2B, the sub pixels 201-204 which make up the master pixel 200 respectively include LEDs 211-214; however, in other examples the sub pixels 201-204 may be based on other emissive devices and/or based on reflective materials or devices, such as digital micromirror devices (DMDs).

In an exemplary aspect of the present invention, one or more of the LEDs 211-214 may vary in color from other ones of the LEDs 211-214 in the master pixel 200. LEDs in accordance with the present invention include microLEDs, OLEDs, quantum dots, and the like. In an exemplary aspect of the present invention, as shown in FIG. 2A, there are two green LEDs 212 and 213, one blue LED 211, and one red LED 214. However, it would be understood by one of ordinary skill in the art that each of the LEDs of the master pixel 200 could be of any color or combination of colors. In an exemplary aspect of the present invention, the emitting areas (i.e., where an emitting area corresponds to the physical size of the region which emits light), of one or more of the LEDs 211-214 may be of a size that is different from other ones of the LEDs 211-214 of the master pixel 200. In an exemplary aspect of the present invention, the LEDs may be of varying sizes to offset differences in electrical to optical conversion efficiency between LEDs of different colors, perceptual differences (for example, different sensitivities to different colors) in the human visual system, and so on. In an exemplary aspect of the present invention, as shown in FIG. 2A, the green (G) sub pixels 212 and 213 are the same size and shape, the red (R) sub pixel 204 and the blue (B) sub pixel 201 are of the same shape, and the red sub pixel 204 is larger in size than the blue sub pixel 201. It would be understood by one of ordinary skill in the art that the size, shape, number, and color of each of the sub pixels 201-204 may differ from one or more of the other sub pixels 201-204 of the master pixel 200. For implementations in which the sub pixels 201-204 are based on an LCoS architecture, the LEDs 211-214 may instead be represented by metallic mirrors driven by circuit components which operate based on a voltage gap across electrodes (e.g., capacitive devices).

As illustrated in FIG. 2A, the sub pixels 201-204 are arranged in accordance with a Bayer type of pattern. As the eye responds most strongly to green when distinguishing detail, the number of green pixels or subpixels included in the master pixel 200 in accordance with the present invention, determine the effective resolution of a display that includes a master pixel 200 in accordance with the present invention.

Figure 3A:
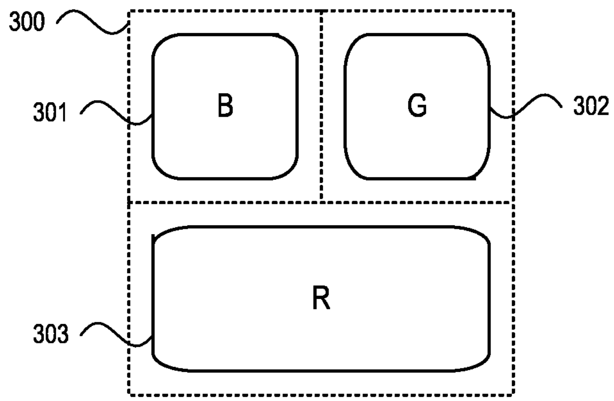
Figure 3B:
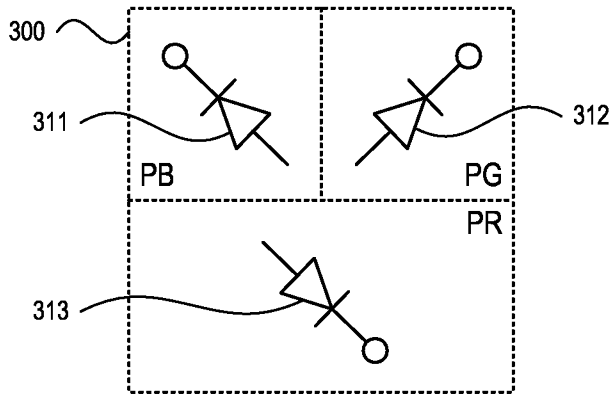

In another exemplary aspect of the present invention, a single green LED sub pixel may be utilized. FIGS. 3A and 3B an example layout of a master pixel 300, in accordance with the present invention, and a schematic rendition of the same. The master pixel 300 may be the same as the pixel 128 illustrated in FIG. 1. As shown in FIG. 3A, the master pixel 300 includes three sub pixels 301-303. In the example shown in FIG. 3B, the sub pixels 301-303 which make up the master pixel 300 respectively include LEDs 311-313; however, in other examples the sub pixels 301-303 may be based on other emissive devices and/or based on reflective materials or devices, such as micromirrors. In an exemplary aspect of the present invention, one or more of the LEDs 311-313 may vary in color from other ones of the LEDs 311-313 in the master pixel 300. LEDs in accordance with the present invention include microLEDs, OLEDs, quantum dots, and the like. Shown in FIG. 3A, there is one green LED 312, one blue LED 211, and one red LED 213. However, it would be understood by one of ordinary skill in the art that each of the LEDs of the master pixel 300 could be of any color or combination of colors. In an exemplary aspect of the present invention, the emitting areas (where an emitting area corresponds to the physical size of the region which emits light) of one or more of the LEDs 311-313 may be of a size that is different from other ones of the LEDs 311-313 of the master pixel 300. In an exemplary aspect of the present invention, the LEDs may be of varying sizes to offset differences in electrical to optical conversion efficiency between LEDs of different colors, perceptual differences in the human visual system, and so on. In an exemplary aspect of the present invention, as shown in FIG. 3A, the green (G) sub pixel 302 and the blue (B) sub pixel 301 are the same size and shape, and the red (R) sub pixel 303 is larger and of a different shape than the green sub pixel 302 and the blue sub pixel 301. It would be understood by one of ordinary skill in the art that the size, shape, number, and color of each of the sub pixels 301-303 may differ from one or more of the other sub pixels 303-303 of the master pixel 300. For implementations in which the sub pixels 301-303 are based on an LCoS architecture, the LEDs 311-313 may instead be represented by circuit components which operate based on a voltage gap across electrodes (e.g., capacitive devices).

Compared to the master pixel 200, the master pixel 300 may have a lower effective resolution due to the reduced number of green sub pixels. However, because red LEDs may have reduced efficiency, by utilizing a larger red component the master pixel 300 may more easily achieve a certain brightness at better efficiency, and/or more easily achieve white balance. The present disclosure is not limited to master pixels which include only three or only four sub-pixels, and in other exemplary aspects of the present disclosure a master pixel may include five or more sub-pixels.

In an exemplary aspect of the present invention, a mapping software module is provided in software or in the display integrated circuit (IC) hardware that maps an original image containing color information (for example, R,G,B pixel color information) onto the physical arrangements of sub-pixels within a master pixel, such that the color information is distributed among the sub pixels 201-204 or 301-303 in such a manner that the amount of color output by the sub pixels 201-204 or 301-303 corresponds, equals, or substantially equals the amount of color represented by the color information input to a software, software module, and/or hardware of a display associated with a display (e.g., display driver software and/or hardware). The software may be stored in a memory associated with any component of the display device (e.g., as shown in FIG. 1, in the graphics processing device 102, the digital drive device 104, the display device 120, and so on).

Figure 4:
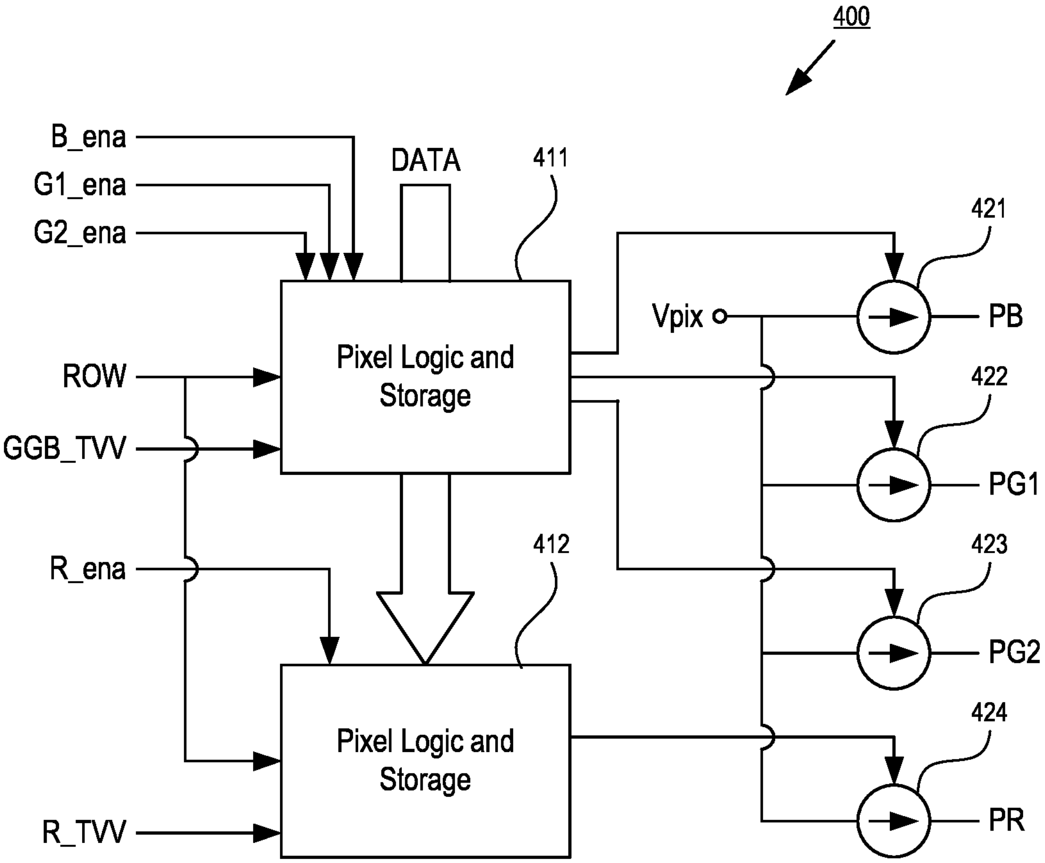
FIGS. 4-6 respectively illustrate block diagrams of exemplary pixel circuitry in accordance with the present invention.

FIG. 4 illustrates pixel circuitry 400 in accordance with one exemplary aspect of the present invention, may correspond to an example of the circuitry used to drive the master pixel 200 illustrated in FIGS. 2A and 2B. The pixel circuitry 400 may be an example of at least a portion of the array-driver logic 125 illustrated in FIG. 1. In an exemplary aspect of the present invention, as illustrated in FIG. 4, all of the LEDs in the master pixel may share a common cathode terminal, and each of the anodes of the LEDs is driven by a separate LED driver. In another exemplary aspect of the present invention, all of the LEDs in the pixel share a common anode, and each cathode of the LEDs is driven by a separate LED driver.

The pixel circuitry 400 receives, as inputs, an image data DATA, a power supply voltage Vpix, a row-writing input ROW which indicates the timing at which rows of master pixels are selected, a time-varying value GGB_TVV for the G1/G2/B sub-pixels (e.g., for sub-pixels 201-203 of FIG. 2A), a time-varying value R_TVV for the red sub-pixels (e.g., for sub-pixel 204 of FIG. 2A), and sub-pixel-specific enabling inputs R_ena, B_ena, G1_ena, and G2_ena which indicate the timing at which the sub-pixels are driven; and outputs current waveforms at nodes PB, PG1, PG2, and PR to drive the corresponding sub-pixels (e.g., to drive LEDs 211-214 via corresponding nodes PB, PG1, PG2, and PR shown in FIG. 2B). The inputs may be received from the digital drive device 104 illustrated in FIG. 1 (e.g., from the bias voltage control 112 and/or the memory 114), and the outputs may be sent to the sub-pixel LEDs (e.g., as shown in FIG. 2B).

Figure 5:
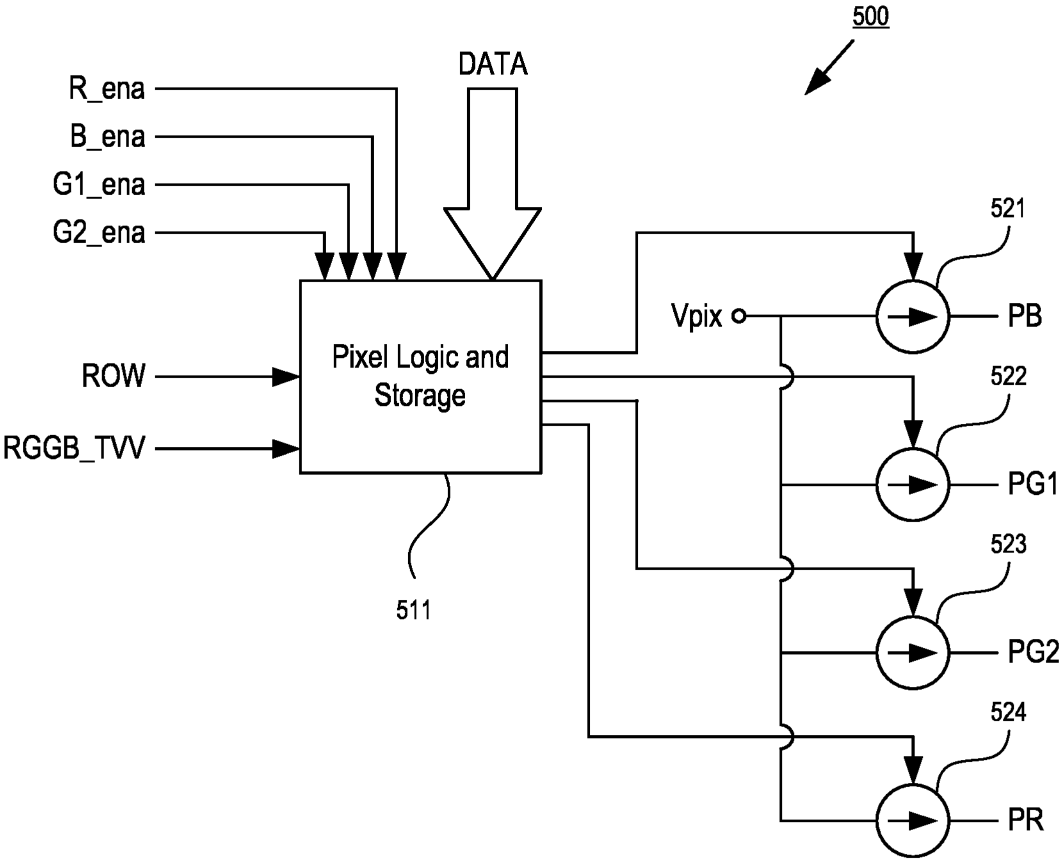

FIG. 5 illustrates pixel circuitry 500 in accordance with the present invention, and may correspond to an example of the circuitry used to drive the master pixel 200 illustrated in FIGS. 2A and 2B. The pixel circuitry 500 may be an example of at least a portion of the array-driver logic 125 illustrated in FIG. 125. In an exemplary aspect of the present invention, as illustrated in FIG. 5, all of the LEDs in the master pixel may share a common cathode terminal, and each of the anodes of the LEDs is driven by a separate LED driver. In another exemplary aspect of the present invention, all of the LEDs in the pixel share a common anode, and each cathode of the LEDs is driven by a separate LED driver.

The pixel circuitry 500 receives, as inputs, an image data DATA, a power supply voltage Vpix, a row-writing input ROW which indicates the timing at which rows of master pixels are selected, a time-varying value RGGB_TVV for the R/G1/G2/B sub-pixels (e.g., for sub-pixels 201-204 of FIG. 2A), and sub-pixel-specific enabling inputs R_ena, B_ena, G1_ena, and G2_ena which indicate the timing at which the sub-pixels are driven; and outputs current waveforms at nodes PB, PG1, PG2, and PR to drive the corresponding sub-pixels (e.g., to drive LEDs 211-214 via corresponding nodes PB, PG1, PG2, and PR shown in FIG. 2B). The inputs may be received from the digital drive device 104 illustrated in FIG. 1 (e.g., from the bias voltage control 112 and/or the memory 114), and the outputs may be sent to the sub-pixel LEDs (e.g., as shown in FIG. 2B).

In an example of pixel circuitry in accordance with the present invention, as illustrated in FIGS. 4-5, each master pixel (i.e., an assembly of one or more sub-pixels such as master pixel 200 of FIG. 2A) includes or is associated with: a current source 421-424 (FIG. 4) or 521-524 (FIG. 5) (e.g., current source driver device such as a transistor or combination of resistor and transistor) for each LED (e.g., for each of LEDs 211-214 of FIG. 2B) of the master pixel driven, and at least one storage device (e.g., a memory device) along with pixel logic (e.g., pixel control logic) that stores the desired or predetermined brightness level of one or more LEDs, and activate and de-activate the currents at the desired or predetermined times such that the LEDs are driven in accordance with a pulse-width modulation (PWM) mode of operation (i.e., where the driving waveform oscillates between zero and a set value, and the brightness is determined by the proportion of time the driving waveform is at the set value multiplied by the drive current) or other series of pulses of variable width or number in response to the stored brightness level value. In FIG. 4, two pixel logic and storage devices 411, 412 are shown. In FIG. 5, one pixel logic and storage device 511 is shown. In comparative examples, four sets of pixel logic and storage devices would be required to drive four sub-pixels; therefore, the pixel circuitry 400 and the pixel circuitry 500 require less circuitry to drive the same number of sub-pixels. While FIGS. 4 and 5 illustrate pixel circuitry corresponding to a master pixel having LEDs that are driven by current sources 421-424 or 521-524, in implementations where the master pixel is based on an LCoS architecture the current sources 421-424 or 521-524 may be replaced with voltage sources. Compared to the pixel circuitry 400, the pixel circuitry 500 may occupy a smaller area. Conversely, compared to the pixel circuitry 500, the pixel circuitry 400 may provide greater available duty cycle and/or a lower required peak current.

Figure 6:
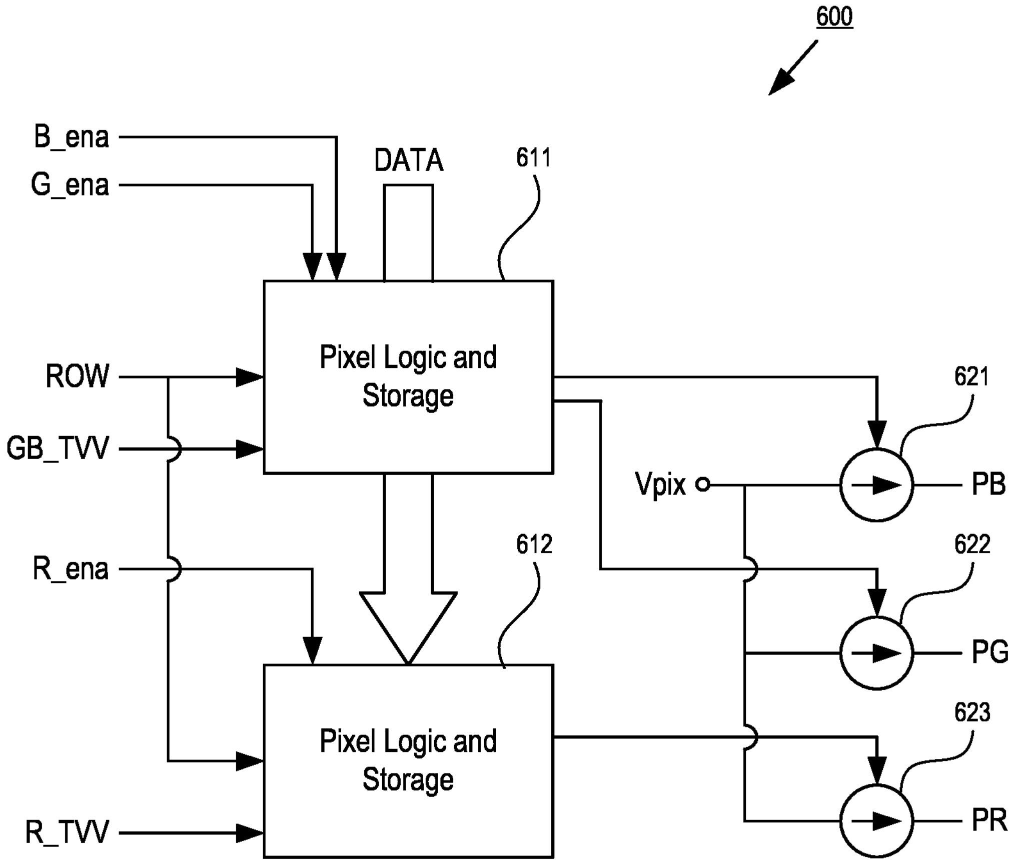

FIG. 6 illustrates pixel circuitry 600 in accordance with the present invention, and may correspond to an example of the circuitry used to drive the master pixel 300 illustrated in FIGS. 3A and 3B. The pixel circuitry 600 may be an example of at least a portion of the array-driver logic 125 illustrated in FIG. 1. In an exemplary aspect of the present invention, as illustrated in FIG. 6, all of the LEDs in the master pixel may share a common cathode terminal, and each of the anodes of the LEDs is driven by a separate LED driver. In another exemplary aspect of the present invention, all of the LEDs in the pixel share a common anode, and each cathode of the LEDs is driven by a separate LED driver.

The pixel circuitry 600 receives, as inputs, an image data DATA, a power supply voltage Vpix, a row-writing input ROW which indicates the timing at which rows of master pixels are selected, a time-varying value GB_TVV for the GB sub-pixels (e.g., for sub-pixels 301 and 302 of FIG. 3A), a time-varying value R_TVV for the red sub-pixels (e.g., for sub-pixel 303 of FIG. 3A), and sub-pixel-specific enabling inputs R_ena, B_ena, and G_ena which indicate the timing at which the sub-pixels are driven; and outputs current waveforms at nodes PB, PG, and PR to drive the corresponding sub-pixels (e.g., to drive LEDs 301-303 via corresponding nodes PB, PG, and PR shown in FIG. 3B). The inputs may be received from the digital drive device 104 illustrated in FIG. 1 (e.g., from the bias voltage control 112 and/or the memory 114), and the outputs may be sent to the sub-pixel LEDs (e.g., as shown in FIG. 3B).

Figure 7:
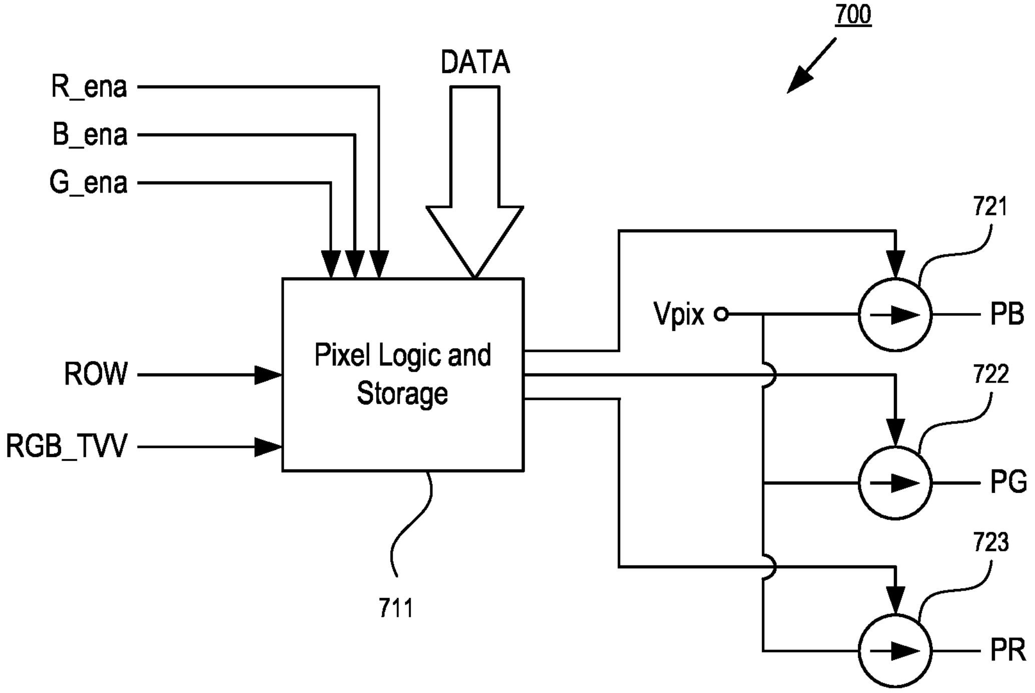
FIGS. 7-9 respectively illustrate details of exemplary pixel circuitry in accordance with the present invention.

FIG. 7 illustrates a pixel circuitry 700 with the present invention, and may correspond to an example of the circuitry used to drive the master pixel 300 illustrated in FIGS. 3A and 3B. The pixel circuitry 700 may be an example of at least a portion of the array-driver logic 125 illustrated in FIG. 1. In an exemplary aspect of the present invention, as illustrated in FIG. 7, all of the LEDs in the master pixel may share a common cathode terminal, and each of the anodes of the LEDs is driven by a separate LED driver. In another exemplary aspect of the present invention, all of the LEDs in the pixel share a common anode, and each cathode of the LEDs is driven by a separate LED driver.

The pixel circuitry 700 receives, as inputs, an image data DATA, a power supply voltage Vpix, a row-writing input ROW which indicates the timing at which rows of master pixels are selected, a time-varying value RGB_TVV for the R/G/B sub-pixels (e.g., for sub-pixels 301-303 of FIG. 3A), and sub-pixel-specific enabling inputs R_ena, B_ena, and G_ena which indicate the timing at which the sub-pixels are driven; and outputs current waveforms at nodes PB, PG, and PR to drive the corresponding sub-pixels (e.g., to drive LEDs 301-303 via corresponding nodes PB, PG, and PR shown in FIG. 3B). The inputs may be received from the digital drive device 104 illustrated in FIG. 1 (e.g., from the bias voltage control 112 and/or the memory 114), and the outputs may be sent to the sub-pixel LEDs (e.g., as shown in FIG. 3B).

In an example of pixel circuitry, in accordance with the present invention, as illustrated in FIGS. 6-7, each master pixel (i.e., an assembly of one or more sub-pixels such as master pixel 300 of FIG. 3A) includes or is associated with: a current source 621-623 (FIG. 6) or 721-723 (FIG. 7) (e.g., current source driver device such as a transistor or combination of resistor and transistor) for each LED (e.g., for each of LEDs 311-313 of FIG. 3B) of the master pixel driven, and at least one storage device (e.g., a memory device) along with pixel logic (e.g., pixel control logic) that stores the desired or predetermined brightness level of one or more LEDs, and activate and de-activate the currents at the desired or predetermined times such that the LEDs are driven in accordance with a pulse-width modulation (PWM) mode of operation or other series of pulses of variable width (where width refers to duration in time, and corresponds to differing brightness levels) or number in response to the stored brightness level value. In FIG. 6, two pixel logic and storage devices 611, 612 are shown. In FIG. 7, only one pixel logic and storage device 711 is shown. In comparative examples, three sets of pixel logic and storage devices would be required to drive three sub-pixels; therefore, the pixel circuitry 600 and the pixel circuitry 700 require less circuitry to drive the same number of sub-pixels. While FIGS. 6 and 7 illustrate pixel circuitry corresponding to a master pixel having LEDs that are driven by current sources 621-623 or 721-723, in implementations where the master pixel is based on an LCoS architecture the current sources 621-623 or 721-723 may be replaced with voltage sources. Compared to the pixel circuitry 600, the pixel circuitry 700 may occupy a smaller area. Conversely, compared to the pixel circuitry 700, the pixel circuitry 600 may provide greater available duty cycle and/or a lower required peak current.

Figure 8:
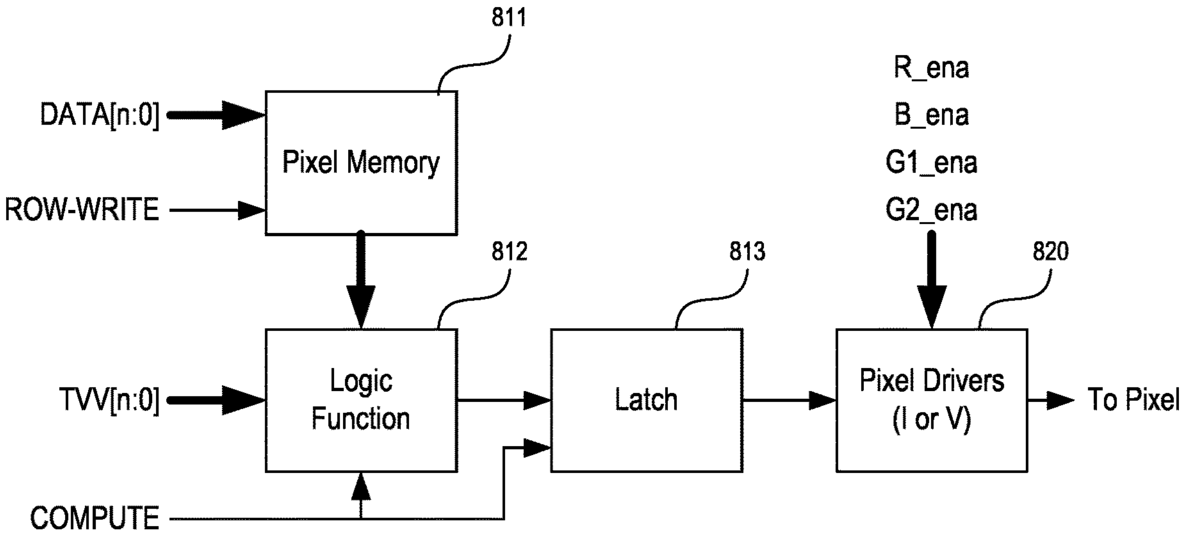
Figure 9:
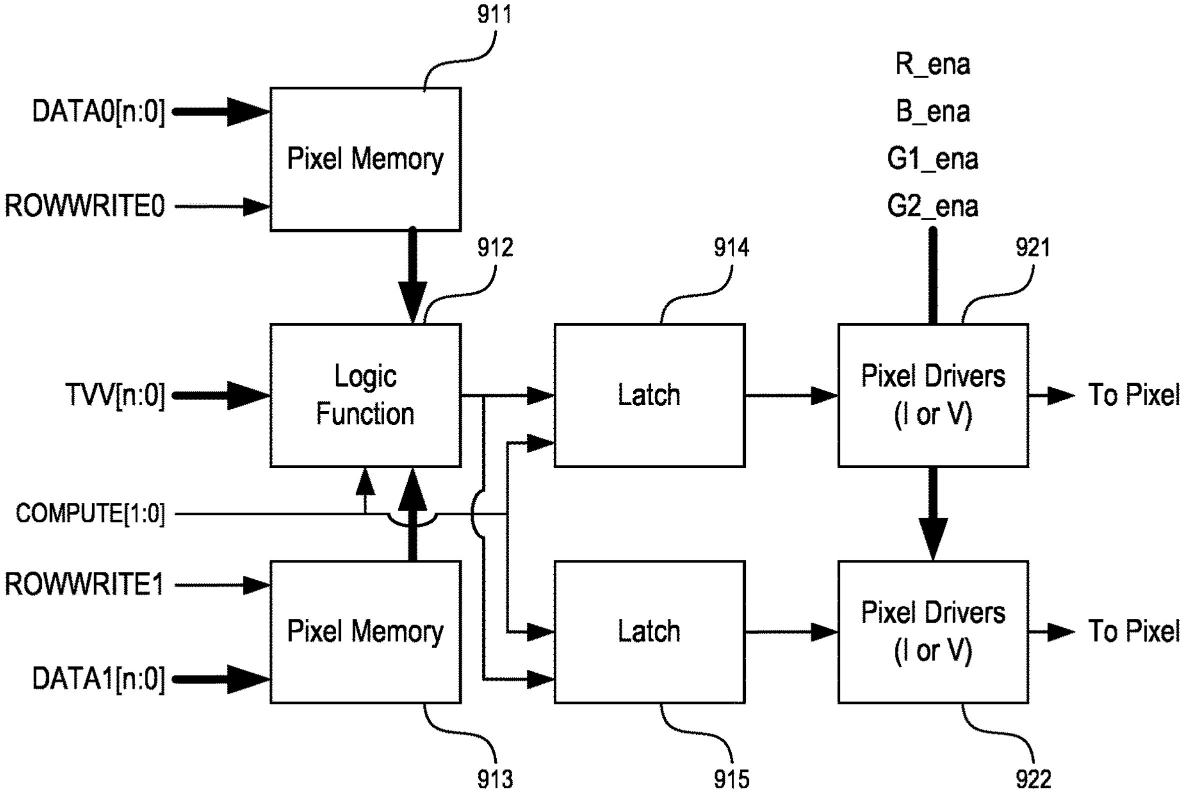
Figure 10:
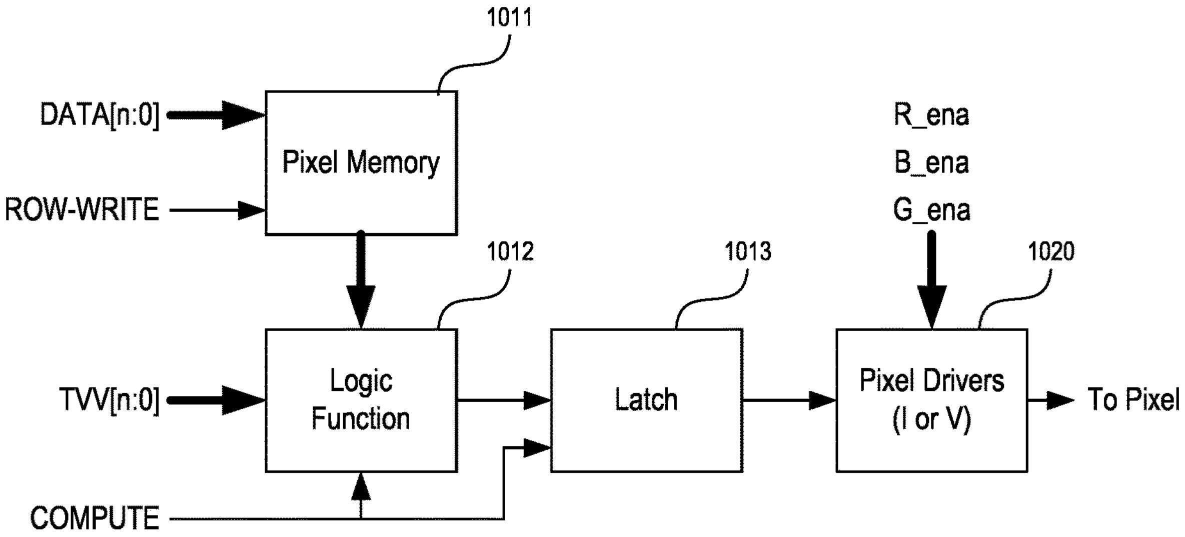
FIGS. 10-14 respectively illustrate exemplary duty cycles of the color components in accordance with the present invention.

In an exemplary aspect of the present invention, while shown together in FIGS. 4-7, the storage device (e.g., a memory device) and the pixel logic circuitry components of the pixel logic and memory circuit 411/412, 511, 611/612, or 711 may be separate components/devices/systems that are electrically coupled (e.g., as illustrated in FIGS. 8-10 which will be described in more detail below).

In an exemplary aspect of the present invention, the current sources 421-424, 521-524, 621-623, or 721-723 shown in FIGS. 4-7 are used as the driving elements, to drive the operation of the LEDs 211-214 or 311-313 shown in FIGS. 2-3, as the LEDs 211-214 or 311-313 convert current to light in a substantially linear manner. This is in contrast to a voltage driving source that may create unwanted variation in light output due to variations, for example, in the resistance of the LED 211-214 or 311-314, its contacts and the power-delivery network of the common-cathode and a driver supply. In an exemplary aspect of the present invention, when the display 120 is an LCoS display, a voltage source may be utilized to drive the pixels/pixel elements/LEDs/LED pixels. A reference to a “pixel” is a reference to a pixel of any type of display, for example, an LCoS pixel or an LED/LED pixel.

In an exemplary aspect of the present invention, the pixel memory (e.g., the pixel memory 811, 911, 913, 1011 illustrated in FIGS. 8-10, and/or the memory components of the pixel logic and storage devices 411, 412, 511, 611, 612, or 711 illustrated in FIGS. 4-7) is loaded with data (e.g., image data (which may include video data)), for example, a value (e.g., a value between and including 0-255 for a pixel capable of 8-bit color depth, or between and including 0-1023 for a pixel capable of 10-bit color depth). In an exemplary aspect of the present invention it would be understood by one of ordinary skill in the art that the bit depth may vary, as well as the value representing that bit depth.

In an exemplary aspect of the present invention, as shown in FIGS. 8-10, the pixel memory 811, 911, 913, and/or 1011 is loaded with data (e.g., image data) by placing the data to be written on a Data bus (identified as “DATA” in the figure) and applying a voltage or current pulse as the ROW-WRITE input which is input to the pixel logic circuitry 812, 912, and/or 1012, that determines when such data (e.g., DATA) is written, into the pixel memory for at least one of the sub pixels. In implementations where the top row and the bottom row of the sub pixel are driven separately (e.g., as in FIG. 9), the pixel memory may be loaded with an image data DATA0 or a DATA1 and supplied with a ROW-WRITE0 input or a ROW-WRITE1 input, as appropriate. In an exemplary aspect of the present invention, a display (e.g., display 120 of FIG. 1) includes an array of pixel elements (e.g., master pixels 128 of FIG. 1), for example, LEDs or mirrors, and the ROWWRITE input determines when data is written for all of the master pixels 128 in a row of the pixel array 126 at a same time.

During a time period (e.g., of a frame or sub-frame) in which a given color of an LED is active, which may be, for example, a whole duration of time of a video/image frame or a sub-set of the whole duration of time (i.e., known as a subframe (e.g., a color-sub-frame)), data stored in the pixel memory 811, 911, 913, and/or 10911 (e.g., image data DATA[n:0, corresponding to a value, such as a color value) and represented by a multi-bit binary value) is input into the pixel logic circuitry 812, 912, and/or 1012. In an exemplary aspect of the present invention, one or more time-varying values (e.g., time varying digital values such as, a multi-bit count value or digital data pattern that is represented by a voltage pulse) identified by reference labels R_TVV and C_TVV data or R_TVV and C_TVV, where R represents a time-varying value for red, and C represents a time-varying value for a combination of green (G) and blue (B), are input into the pixel logic circuitry 812, 912, and/or 1012 (e.g., LED pixel control logic circuitry) and logical functions (such as comparison, summation, OR, AND) combine the time-varying values with the image/video data (such as brightness data corresponding to color value value) and generates an output that controls the LED/sub pixel via the driver 820, 921, 922, and/or 1020 (e.g., current or voltage driver device). For example, in an exemplary aspect of the present invention, a master clock is coupled to the pixel logic circuitry, and during each period, the master clock increments a color-specific time-varying count value (e.g., R_TVV and C_TVV data or R_TVV and C_TVV), over a period of time (e.g., over a frame or subframe), and such count value is input to the pixel logic circuitry 812, 912, and/or 1012 and utilized to control when the current control device is activated with the stored data (e.g., image/video data, such as brightness data) received by the pixel logic circuitry 812, 912, and/or 1012 to effect or achieve, for example, the desired or predetermined color, intensity, or luminance of a respective one of the LEDs/LED pixels. In an exemplary aspect of the present invention, the data stored in the pixel memory 811, 911, 913, and/or 1011 is logically combined with an incoming multi-bit count value or digital data pattern on inputs/data/values R_TVV and C_TVV and the logical function (such as comparison, summation, OR, AND) determines if the current control driven by that logic is set high or low for each period of a master clock which is controlling the advancement or changes) of the R_TVV and C_TVV inputs/data/values. For example, in an exemplary aspect of the present invention, the master clock may advance the count from 0-256. The net result is digital modulation of an LED output over time. In an embodiment of the present invention, as shown in FIG. 4, two pixel logic and storage devices 411, 412 are utilized to control the four LEDs of the master pixel, for example, one pixel logic and storage device 411 circuit controls the green (G1 and G2) and blue LEDs/LED pixels and the other pixel logic circuit and storage device 412 controls the red LED/LED pixel. In addition to the count values, enable inputs R_ena, G1_ena, G2_ena and B_ena may be used to activate one of the LED drivers at a time so that the modulation function is only applied to certain ones of the LEDs at a time. In another exemplary aspect of the present invention, as shown in FIG. 6, two pixel logic and storage devices 611, 612 are utilized to control the three LEDs of the master pixel, for example, one pixel logic and storage device 611 controls the green and blue LEDs/LED pixels and the other pixel logic and storage device 612 controls the red LED/LED pixel. In addition to the count values, enable inputs R_ena, G_ena, and B_ena may be used to activate one of the LED drivers at a time so that the modulation function is only applied to certain ones of the LEDs at a time.

In an exemplary aspect of the present invention, as illustrated in FIG. 5, all pixels/LEDs (e.g., three colors of the master pixel are represented by one or more LEDs or varying colors) may be driven by a single pixel logic and storage device 511. The number of such pixel logic circuit/memory blocks required is determined by the desired duty cycles.

FIGS. 8-10 illustrate exemplary pixel circuitry of the present invention, that includes logical operations of the pixel logic circuitry (i.e., logical operation of the pixel). In particular, FIG. 8 illustrates an example in which components of the pixel logic and storage devices 411 and 412 of FIG. 4 are separated; FIG. 9 illustrates an example in which components of the pixel logic and storage devices 511 of FIG. 5 are separated; and FIG. 10 illustrates an example in which components of the pixel logic and storage devices 611 and 612 of FIG. 6 or the pixel logic and storage device 711 of FIG. 7 are separated.

In FIG. 8, the pixel logic and storage device receives, as inputs, an image data DATA[n:0], a row-writing input ROW-WRITE which indicates the timing at which rows of master pixels are selected, a time-varying value TVV[n:0], a computing input COMPUTE which indicates the timing at which the logic function 812 and latch 813 perform computations, and sub-pixel-specific enabling inputs (e.g. and outputs a voltage or current waveform to drive the pixel. The pixel drivers 820 (e.g., the current sources of FIGS. 4-7 or, in LCoS implementations, voltage sources) are operatively connected to a pixel memory 811, a logic function 812, and a latch 813. The logic function 812 may store the desired or predetermined brightness level of one or more sub pixels, and activate and de-activate the currents (or change the voltages) at the desired or predetermined times such that the sub pixels are driven in accordance with a PWM mode of operation or other control in response to the stored brightness level value (e.g., stored in the pixel memory 811).

In FIG. 9, different rows of sub-pixels within the master pixel may be separately driven. The pixel logic and storage device receives, as inputs, a top-row image data DATA0[n:0] and a bottom-row image data DATA1[n:0], a top-row-writing-input ROWWRITE0 and a bottom-row-writing input ROWWRITE1 which indicate the timing at which top rows of sub-pixels and rows of master pixels are selected, a time-varying value TVV[n:0], a computing input COMPUTE which indicates the timing at which the logic function 912 and latches 914/915 perform computations, and sub-pixel-specific enabling inputs R_ena, B_ena, G1_ena, and G2_ena which indicate the timing at which the sub-pixels are driven; and outputs a voltage or current waveform to drive the pixel. Thus, the first pixel drivers 921 (e.g., the current sources of a top row of sub pixels within the master pixel corresponding to FIGS. 4-7 or, in LCoS implementations, voltage sources) are operatively connected to a first pixel memory 911, a logic function 912, and a first latch 914. The logic function 912 may output a voltage or current waveform representing the desired or predetermined brightness level of one or more sub pixels in the top row, and activate and de-activate the currents (or change the voltages) at the desired or predetermined times such that the sub pixels are driven in accordance with a PWM mode of operation or other control in response to the stored brightness level value (e.g., stored in the first pixel memory 911). The second pixel drivers 922 (e.g., the current sources of a bottom row of sub pixels within the master pixel corresponding to FIGS. 4-7 or, in LCoS implementations, voltage sources) are operatively connected to a second pixel memory 913, the logic function 912, and a second latch 915. The logic function 912 may output a voltage or current waveform representing the desired or predetermined brightness level of one or more sub pixels in the bottom row, and activate and de-activate the currents (or change the voltages) at the desired or predetermined times such that the sub pixels are driven in accordance with a PWM function or other control in response to the stored brightness level value (e.g., stored in the second pixel memory 913).

In an exemplary aspect of the present invention, as illustrated in FIG. 9, the Logic Function elements/components/devices of the pixel logic circuitry is shared between two adjacent master pixels, and is used in a time-multiplexed manner such that a computation by the Logic Function elements/components/devices of the pixel logic circuitry is on alternate cycles between each master pixel or LED pixel.

In FIG. 10, the pixel logic and storage device receives, as inputs, an image data DATA[n:0], a row-writing input ROW-WRITE which indicates the timing at which rows of master pixels are selected, a time-varying value TVV[n:0], a computing input COMPUTE which indicates the timing at which the logic function 1012 and latch 1013 perform computations, and sub-pixel-specific enabling inputs R_ena, B_ena, and G_ena which indicate the timing at which the sub-pixels are driven; and outputs a voltage or current waveform to drive the pixel the pixel drivers 1020 (e.g., the current sources of FIGS. 4-7 or, in LCoS implementations, voltage sources) are operatively connected to a pixel memory 1011, a logic function 1012, and a latch 1013. The logic function 1012 may store the desired or predetermined brightness level of one or more sub pixels, and activate and de-activate the currents (or change the voltages) at the desired or predetermined times such that the sub pixels are driven in accordance with a PWM mode of operation or other control in response to the stored brightness level value (e.g., stored in the pixel memory 1011). However, the example of FIG. 10 is analogous to the example of FIG. 8, but for the case in which the master pixel includes only three sub pixels (R, G, B) instead of four sub pixels (R, G1, G2, B).

In an exemplary aspect of the present invention, the Pixel Memory 811, 911, 913, and/or 1011 is loaded by presenting a data value on an input data bus, and loading it into the memory with the ROW-WRITE (or ROW-WRITE0/ROW-WRITE1) input (e.g., a voltage input or voltage pulse input). A pixel/LED/LED pixel of the present invention emits or reflects light corresponding in intensity to the data value loaded, in accordance with a count value (e.g., data or changing digital pattern such as a linear count or a 1-hot encoded value (e.g., a data stream where only one of the values is high all of the time) that is transmitted via a bus which carries the time-varying voltage values (e.g., the RGGB_TVV bus or the TVV value) to the Logic Function/pixel logic circuitry/elements/components/devices (see FIGS. 8-10) of the pixel logic circuitry (e.g., the pixel logic circuitry illustrated and included in the Pixel Logic & Memory blocks illustrated in FIGS. 4-7). The logic function/pixel logic circuitry performs combinatorial logic (e.g., a logic combination (such as AND, OR, XOR or equivalency function) of the stored data value and the incoming TVV value to produce a logic result, which is transmitted to a latch (which may be the last one, of multiple, and is electrically coupled to the Pixel Driver) that outputs data to the Pixel Driver, and such data controls the Pixel Driver (e.g., which may be a final one of multiple, and is the current source or current source device in the case of an LED or microLED display, and a voltage source/voltage source device in the case of an LCoS or liquid crystal (LCD) display or microdisplay). In an exemplary aspect of the present invention, the logic function/pixel logic circuitry performs a comparison logic function. For example, in an exemplary aspect of the present invention the Pixel Driver may be a current source when the display is a microLED displays or may be a voltage level-shifter when the display is an LCoS display. In an exemplary aspect of the present invention, the Latches of FIGS. 8-10 are updated periodically (e.g., whenever the value of TVV changes), in accordance with activation by the COMPUTE input which is created by logic in the backplane outside of the pixel array. In an exemplary aspect of the present invention, the COMPUTE input may also be used to control the pixel control processing/activity in the Logic Function elements/components/devices of the pixel logic circuitry and reduce its power dissipation by stopping and starting the internal activity so that energy is only used when needed.

Figure 11:
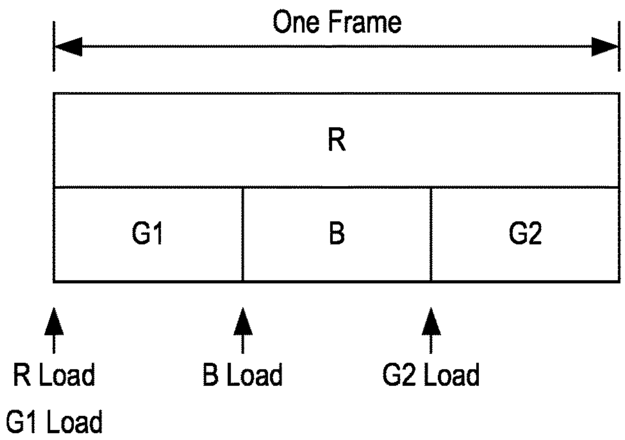
Figure 12:
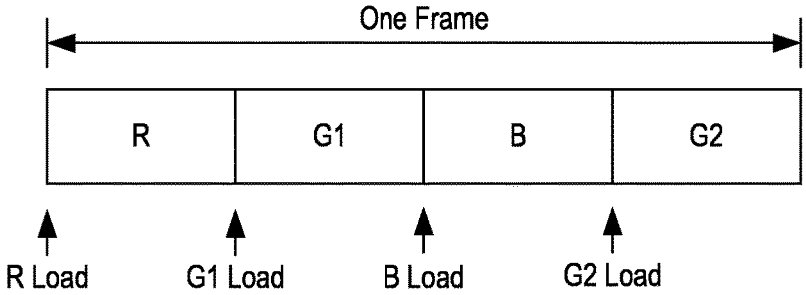
Figure 13:
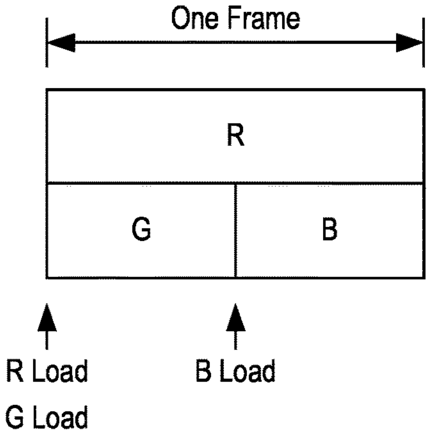

FIGS. 11-14 illustrate the maximum duty cycle of the colors corresponding to each LED of a master pixel (e.g., each colored LED) as compared to the length of a frame. For example, the maximum extent of the duty cycle, being the length of a full video frame, is illustrated in FIGS. 11-14. FIG. 11 may correspond to the maximum duty cycle for sub-pixels driven by pixel driving circuitry as illustrated in FIGS. 4 and 8; FIG. 12 may correspond to the maximum duty cycle for sub-pixels driven by pixel driving circuitry as illustrated in FIGS. 5 and 9; FIG. 13 may correspond to the maximum duty cycle of sub-pixels driven by pixel driving circuitry as illustrated in FIGS. 6 and 10; and FIG. 14 may correspond to the maximum duty cycle of sub-pixels driven by pixel driving circuitry as illustrated in FIGS. 7 and FIG. 10. However, it should be understood by one of ordinary skill in the art that the duty cycle/length of the duty cycle may vary. Moreover, the length of the frames as illustrated in different in each of FIGS. 11-14 for explanatory purposes, in practical implementations the length of each frame may be the same as or different from one another.

In the first example (illustrated in FIG. 11), a larger duty cycle is used for the Red LED because of its lower efficiency. With each maximum possible duty cycle, the amount of time each individual LED is turned on multiplied by its drive current determines the LED's/LED pixel's relative brightness. As shown in FIG. 4, the Memory (included in the pixel logic and storage device 412) coupled to the circuitry driving the Red LED (e.g., current source 424) is loaded with a value, once, at the start of the full frame, whereas the Memory (included in the pixel logic and storage device 411) coupled to the circuitry used to drive the two Green and one Blue LEDs (e.g., current sources 422, 423, and 421, respectively) is loaded at the start of respective color sub-frames, thus achieving re-use of the circuitry (i.e., utilizing the pixel logic circuitry to drive the color sub-frames individually, for example at different times, without the need to have separate pixel logic circuitry for each pixel or LED pixel). Thus, as shown in FIG. 11, the Red LED is driven for the entire frame in parallel with the Green LEDs and the Blue LED, each of which are driven for one-third of the frame in a field sequential manner. In other words, the sub pixels are driven in a hybrid between full-time-on and field-sequential operation.

In an example of pixel circuitry, in accordance with the present invention, corresponding to the pixel circuitry structure of FIG. 5, an image or video frame is divided into four periods, as illustrated in FIG. 12, whereby each subpixel is independently activated, turned on, turned off, or loaded, in accordance with the data (e.g., image or video data) during one of the four periods. Thus, as shown in FIG. 12, each LED is driven for one-fourth of the frame in a field sequential manner. This process, involving four periods, also reduces the amount of circuitry needed to drive the pixels (e.g., microLED pixel or LCoS pixel), in exchange for operating at a faster clock rate and requiring a higher current during the Red period.

In an example of the pixel circuitry, in accordance with the present invention, corresponding to the pixel circuitry structure of FIG. 6, a larger duty cycle is used for the Red LED because of its lower efficiency. With each maximum possible duty cycle, the amount of time each individual LED is turned on determines the LED's/LED pixel's relative brightness. As shown in FIG. 6, the Memory (included in the pixel logic and storage device 612) coupled to the circuitry driving the Red LED (e.g., current source 623) is loaded with a value, once, at the start of the full frame, whereas the Memory (included in the pixel logic and storage device 611) coupled to the circuitry used to drive the one Green and one Blue LEDs (e.g., current sources 622 and 621, respectively) is loaded at the start of respective color sub-frames, thus achieving re-use of the circuitry (i.e., utilizing the pixel logic circuitry to drive the color sub-frames individually, for example at different times, without the need to have separate pixel logic circuitry for each pixel or LED pixel). Thus, as shown in FIG. 13, the Red LED is driven for the entire frame in parallel with the Green LED and the Blue LED, both of which are driven for one-third of the frame in a field sequential manner. In other words, the sub pixels are driven in a hybrid between full-time-on and field-sequential operation for a three-sub-pixel master pixel.

Figure 14:
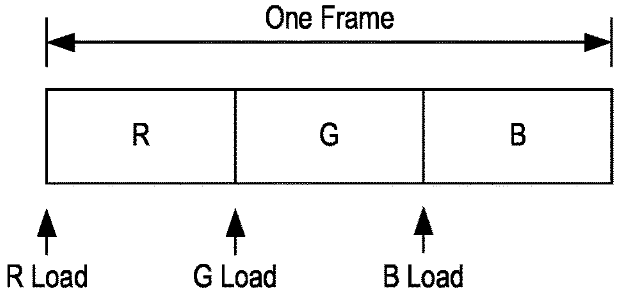

In an example of pixel circuitry, in accordance with the present invention, corresponding to the pixel structure of FIG. 7, an image or video frame is divided into three periods, as illustrated in FIG. 14, whereby each subpixel is independently activated, turned on, turned off, or loaded, in accordance with the data (e.g., image or video data) during one of the four periods. Thus, as shown in FIG. 14, each LED is driven for one-third of the frame in a field sequential manner. This process, involving three periods, also reduces the amount of circuitry needed to drive the pixels (e.g., microLED pixel or LCoS pixel), in exchange for operating at a faster clock rate and requiring a higher current during the Red period.

Some examples of the pixel circuitry, in accordance with the present invention, provide for the driving of sub-pixels in a field-sequential fashion, or a hybrid between full-time-on and field-sequential operation. This allows re-use of the pixel circuitry (e.g., pixel drive or control circuitry over time), and reduces the number of copies of such circuitry needed. Consequently, a master pixel is reduced in size, and thus, a whole display that includes such master pixel is likewise reduced in size.

While the above illustrations of FIGS. 11 and 13 illustrate implementations where the Red sub pixel has a maximum duty cycle longer than that of the other color sub pixels, the present disclosure is not so limited. In an exemplary aspect of the present invention, one or more other color sub pixels may be driven for longer than the Red sub pixel. Moreover, as noted above, the present disclosure is not limited solely to master pixels using red, blue, and green, and instead may be applied to other colors or combinations of colors.

In each of FIGS. 11-14, the brightness of a sub pixel is determined by its duty cycle relative to the maximum duty cycle within the frame. For example, a sub pixel with a relative duty cycle of 50% will be illuminated for 50% of its allocated sub frame and will be at a medium brightness. In order to minimize the energy consuming signal transitions, single-pulse PWM may be implemented; that is, a single pulse per color frame. This may be implemented through the use of a global N-bit counting bus and a comparator, as will be described in more detail below with regard to FIG. 15. A sub pixel may be loaded with a data value (e.g., a DAC code or grayscale value), thereby to trigger the pulse transition at the point within the sub-frame when the DAC code is equal to the bus counter. For example, in a sub pixel with 8-bit color depth and a 50% duty cycle, the sub pixel may be loaded with a DAC code of 128, which will cause the corresponding LED to turn on halfway through the subframe (when the counter has a value of 128).

Silicon backplanes used with prior LCoS designs could be adapted for use with microLED displays. However, such backplanes may, in certain implementations, be only used to drive single-color LEDs, and thus would require multiple display panels to achieve full color. If such a backplane is applied to a multi-color LED process, either the resolution will be reduced or the size would have to be increased because of the need to use three to four (3-4) pixel circuits to drive three to four (3-4) LEDs constituting a master pixel (i.e., a full-color pixel composed of sub-pixels of each color). With the reduced pixel circuitry, the sophisticated pixel logic circuitry may be positioned under each pixel, in an exemplary aspect of the present invention.

Pixel circuitry, in accordance with the present invention, achieves a reduced-size display, without sacrificing power or speed. Unlike LCoS displays, LED displays, such as micro LED displays, in accordance with the present invention, illuminate only the active pixels, i.e., the "on" pixels" (e.g., LEDS or microLEDS), rather than utilizing an external illumination source that shines light on the entire display (e.g., an LCoS display).

As noted above, in one example of a logic function in accordance with the present disclosure, a comparator may be used to implement PWM in accordance with the present disclosure. Digital comparator circuits may consume a large amount of area. Display size may be further reduced by time multiplexing the use of the digital comparator circuit between adjacent pixels or groups of pixels (e.g., between multiple sub pixels within a master pixel, between groups of sub pixel within the master pixel, and/or between groups of master pixels). The timing may be synchronized with the global bus so that each sub pixel or pixel is evaluated during a portion of the global count period.

Figure 15:
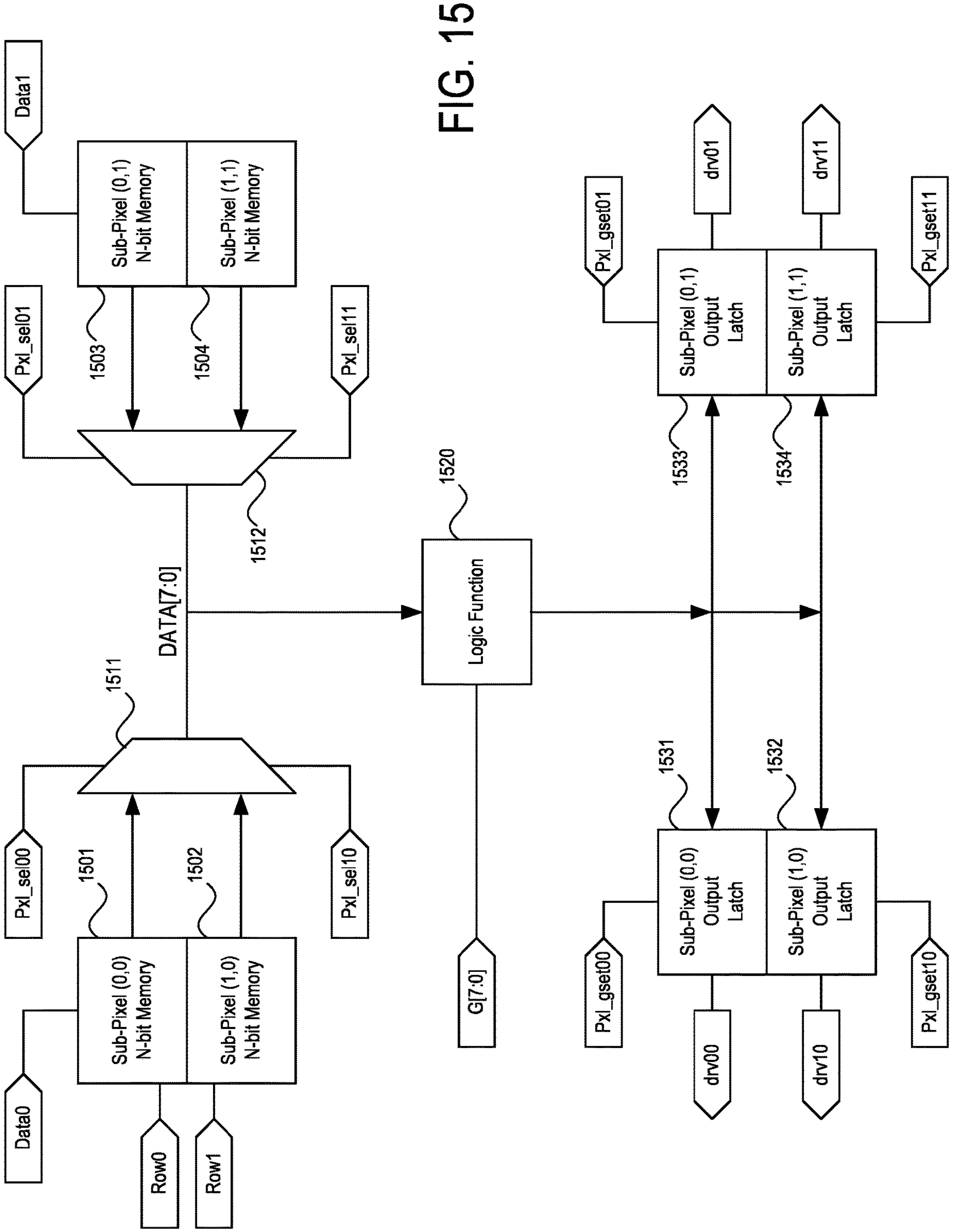
FIG. 15 illustrates details of exemplary pixel circuitry in accordance with the present invention.

In an exemplary aspect of the present invention, as illustrated in FIG. 15, logic circuitry includes a comparator that is shared among multiple sub pixels and operated in a time sequential manner among the columns of sub pixels within a master pixel. The logic circuitry of FIG. 15 receives, as inputs, an image data Data0 for a first column of sub-pixels within a master pixel, an image data Data1 for a second column of sub-pixels within the master pixel, a row-selection input Row0 for a first row of sub-pixels within the master pixel, a row-selection input Row1 for a second row of sub-pixels within the master pixel, four sub-pixel memory selection inputs Pxl_selxy (where x represents the x position of the corresponding sub-pixel within the maters pixel, y represents the y position of the corresponding sub-pixel within the master pixel, and x and y are both 0 at the upper-left sub-pixel), four sub-pixel latch selection outputs Pxl_gsetxy selxy (where x represents the x position of the corresponding sub-pixel within the maters pixel, y represents the y position of the corresponding sub-pixel within the master pixel, and x and y are both 0 at the upper-left sub-pixel), and a global timing counter G[7:0]. The logic circuitry of FIG. 15 outputs four pixel driving waveforms (e.g., time-varying voltage values) drvxy (where x represents the x position of the corresponding sub-pixel within the maters pixel, y represents the y position of the corresponding sub-pixel within the master pixel, and x and y are both 0 at the upper-left sub-pixel)

The logic circuitry of FIG. 15 includes four sub-pixel memory circuits 1501-1504, two multiplexers 1511-1512, a logic function 1520 (which may, in some implementations, be a combinatorial logic circuit such as digital comparator circuit), and four sub-pixel latches 1531-1534. The logic circuitry may also include a demultiplexer between the logic function 1520 and the four sub-pixel latches 1531-1534. In FIG. 15, "Sub-Pixel (x,y)" refers to the sub pixel at the (x,y) position within the master pixel, where (0,0) identifies the sub pixel in the upper-left corner of the master pixel.

The components of FIG. 15 may correspond to the pixel drive and storage devices 411, 412, 511, 611, 612, and/or 711 illustrated in FIGS. 4-7. For example, the sub-pixel memory circuits 1501-1504 may correspond to the pixel memories 811, 911, 913, and/or 1011 illustrated in FIGS. 8-10; the multiplexers 1511-1512 and logic function 1520 may correspond to the logic functions 812, 912, and/or 1012 illustrated in FIGS. 8-10; and the sub-pixel latches 1531-1534 may correspond to the latches 813, 914, 915, and/or 1013 illustrated in FIGS. 8-10. The sub-pixel memory circuits 1501-1504 may each be implemented as an N-bit memory circuit corresponding to the color depth of the sub pixel. For example, the sub-pixel memory circuits 1501-1504 may be 8-bit SRAM circuits.

FIG. 15 illustrates an example of four sub pixels arranged in a 2×2 array within a master pixel. The sub-pixel memories 1501 and 1502 (corresponding to the left column of sub pixels) are loaded by presenting a data value Data0 on an input data bus, and loading it into the memory with a Row0 or Row1 input, depending on the row in which the sub pixel is located. The sub-pixel memories 1503 and 1504 (corresponding to the right column of sub pixels) are loaded by presenting a data value Data1 on an input data bus, and loading it into the memory with the Row0 or Row1 input, depending on the row in which the sub pixel is located. The outputs of sub-pixel memories 1501-1502 and 1503-1504 are multiplexed together by multiplexers 1511 and 1512, respectively, and output as an 8-bit data signal DATA[7:0] on a common bus based on pixel selection inputs Pxl_sel00, Pxl_sel10, Pxl_sel01, and Pxl_sel11, which select between inputs from the corresponding sub-pixel memories 1501-1504, respectively. The logic function 1520 receives both the data value DATA[7:0] and an 8-bit global counter value G[7:0]. The output of the logic function 1520 will flip at the point in time when the data signal is equal to the global counter value. This output is provided to the sub-pixel latches 1531-1534. Then, the sub-pixel latches 1531-1534 output the stored signal or value based on the operation of a corresponding output selection waveform Pxl_gsel00, Pxl_gsel10, Pxl_gsel01, and Pxl_gsel11. The output from each sub-pixel latch is provided to the corresponding pixel driver drv00, dry10, dry01, or dry11 as appropriate.

The subject matter described herein can be implemented in digital electronic circuitry, including the structural means disclosed in this specification and structural equivalents thereof, or in combinations of them.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A display system having pixel circuitry, comprising:

a storage device to store brightness data;

a display having a master pixel, the master pixel comprising at least two sub pixels;

a pixel logic circuit to control sub pixels, the pixel logic circuit coupled to the storage device; and at least two driver devices, each coupled to a corresponding one of the at least two sub pixels and to the pixel logic circuit;

the pixel logic circuit controlling the at least two sub pixels by:

receiving a master clock comprising for each predetermined period of the master clock, a time varying waveform for each sub pixel of the at least two sub pixels; and for each sub pixel of the at least two sub pixels:

applying combinatorial logic to the brightness data stored in the storage device and the time varying waveform corresponding to the sub pixel; and outputting a result of the combinatorial logic as an activation signal to the driver device corresponding to the sub pixel.

2. The display system of claim 1, wherein the at least two driver devices are current driver devices and the display is a microLED display, an OLED display, or an LED display.

3. The display system of claim 1, wherein the at least two driver devices are voltage driver devices and the display is an LCoS display or an LCD display.

4. The display system of claim 1, wherein the pixel logic circuit drives one of the at least two sub pixels in an off state, while driving a state of an other one of the at least two sub pixels between an on and off state.

5. The display system of claim 1, wherein the at least two sub pixels comprise four sub pixels including two green sub pixels, one blue sub pixel, and one red sub pixel, and the pixel logic circuit drives the red sub pixel in an on state while driving the two green sub pixels and the blue sub pixel in accordance with a field sequential color (FSC) sub pixel drive process.

6. The display system of claim 1, wherein the display is a microLED display and the sub pixels are microLEDs.

7. The display system of claim 1, wherein the display is an LCoS display and the sub pixels include reflective materials.

8. The display system of claim 1, wherein the at least two sub pixels comprise four sub pixels including two green sub pixels, one blue sub pixel, and one red sub pixel, and the pixel logic circuit drives the two green sub pixels, the blue sub pixel, and the red sub pixel in accordance with a field sequential color (FSC) sub pixel drive process.

9. The display system of claim 1, wherein the at least two sub pixels comprise a blue sub pixel and a red sub pixel, and the blue sub pixel has a smaller emitting area than the red sub pixel.

10. The display system of claim 1, further comprising:

a latch, internal or external to the pixel logic circuit; wherein:

the pixel logic circuit receives the brightness data and writes the brightness data to the storage device in response to a row-write waveform; and the pixel logic circuit executes the combinatorial logic in response to the pixel logic circuit receiving an instruction to implement.

11. The display system of claim 10, wherein the pixel logic circuit outputs the activation signal to the first driver devices corresponding to sub pixels that have been enabled by a signal supplied to the pixel logic circuit.

12. The display system of claim 1, wherein:

the pixel logic circuit includes a combinatorial logic circuit to apply the combinatorial logic;

the storage device includes at least two sub pixel memories coupled to an input of the combinatorial logic circuit, and at least two sub pixel latches coupled to an output of the combinatorial logic circuit; and the combinatorial logic circuit applies the combinatorial logic to an output of a first sub pixel memory of the at least two sub pixel memories during a first portion of a frame period, and applies the combinatorial logic to an output of a second sub pixel memory of the at least two sub pixel memories during a second portion of the frame period, the brightness data comprising the output of the first sub pixel memory and the output of the second sub pixel memory.

13. The display system of claim 1, wherein:

the pixel logic circuit includes a combinatorial logic circuit to apply the combinatorial logic;

the combinatorial logic circuit is shared with a second master pixel of the display; and the combinatorial logic circuit operates in a time-multiplexed manner to alternate between applying the combinatorial logic to the master pixel and the second master pixel.

14. A pixel driving circuit, comprising:

a pixel logic and storage device;

a first driver device coupled to a first green sub pixel of a pixel, the pixel logic and storage device being coupled to the first driver device; and a second driver device coupled to a second green sub pixel of the pixel, the pixel logic and storage device being coupled to the second driver device;

the pixel logic and storage device controlling the first sub pixel and second sub pixel by:

receiving a master clock comprising, for each predetermined period of the master clock, a first time varying waveform for the first sub pixel and a second time varying waveform for the second sub pixel;

applying combinatorial logic to first brightness data stored in the storage device and the first time varying waveform;

outputting a result of the combinatorial logic as an activation signal to the first driver device;

applying combinatorial logic to second brightness data stored in the storage device and the second time varying waveform; and outputting the result of the combinatorial logic as an activation signal to the second driver device.

15. The pixel driving circuit of claim 14, wherein the first and second driver devices are current driver devices and the pixel is a microLED pixel, an OLED pixel or an LED pixel.

16. The pixel driving circuit of claim 14, wherein the first and second driver devices are voltage driver devices and the pixel is an LCoS pixel or an LCD pixel.

17. The pixel driving circuit of claim 14, further comprising:

a third driver device coupled to a third sub pixel of the sub pixel, wherein the pixel logic and storage device is coupled to the third driver device, and wherein the pixel logic and storage device is configured to operate the first driver device, the second driver device, and the third driver device in a field sequential manner.

18. The pixel driving circuit of claim 17, wherein the pixel logic and storage device is configured to operate the first driver device during a period in which the pixel logic and storage device operates the the second driver device and the third driver device in the field sequential manner.

19. The pixel driving circuit of claim 17, wherein the pixel logic and storage device is configured to operate the first driver device, the second driver device, and the third driver device in the field sequential manner.

20. The pixel driving circuit of claim 14, wherein:

the pixel logic and storage device includes a combinatorial logic circuit to apply the combinatorial logic;

the combinatorial logic circuit is shared with a second pixel; and the combinatorial logic circuit operates in a time-multiplexed manner to alternate between applying the combinatorial logic to the pixel and the second pixel.

* * * * *